United States Patent [19]

Brand et al.

[11] Patent Number: 5,855,662
[45] Date of Patent: Jan. 5, 1999

[54] AQUEOUS PIGMENT PREPARATIONS

[75] Inventors: Achim Brand, Köln; Josef Leitermann, Leverkusen; Roger Nyssen, Dormagen; Klaus Schubert, Köln; Erhard Schuffenhauer, Leverkusen; Karlheinz Wieser, Leverkusen; Herbert Wigger, Leverkusen, all of Germany

[73] Assignee: Bayer Aktiengesellschaft, Leverkusen, Germany

[21] Appl. No.: 621,915

[22] Filed: Mar. 26, 1996

[30] Foreign Application Priority Data

Mar. 30, 1995 [DE] Germany .................. 195 11 624.0

[51] Int. Cl.⁶ .................................................. C08K 5/00
[52] U.S. Cl. ...................... 106/498; 106/311; 106/402; 106/412; 106/413; 106/429; 106/447; 106/448; 106/460; 106/465; 106/471; 106/476; 106/487; 106/491; 106/493; 106/497; 106/499; 508/494
[58] Field of Search ................... 106/499, 311, 106/402, 413, 412, 497, 498, 493, 429, 447, 448, 460, 465, 471, 476, 487, 491; 508/494

[56] References Cited

U.S. PATENT DOCUMENTS

| | | | |
|---|---|---|---|
| 4,186,029 | 1/1980 | Aign et al. | 8/552 |
| 4,369,070 | 1/1983 | Aign et al. | 524/90 |
| 4,436,522 | 3/1984 | Niwa et al. | 8/524 |

FOREIGN PATENT DOCUMENTS

| | | |
|---|---|---|
| 0497172 | 8/1992 | European Pat. Off. . |
| 1121814 | 1/1962 | Germany . |
| 2711240 | 9/1978 | Germany . |
| 2730223 | 1/1979 | Germany . |
| 2732732 | 1/1979 | Germany . |
| 3641677 | 6/1988 | Germany . |
| 854952 | 11/1960 | United Kingdom . |

OTHER PUBLICATIONS

Chemical Abstracts, Registry file, RN106392–12–5, Columbus Ohio, no date.

Primary Examiner—Mark L. Bell
Assistant Examiner—Scott L. Hertzog
Attorney, Agent, or Firm—Sprung Kramer Schaefer & Briscoe

[57] ABSTRACT

Aqueous pigment preparations comprising
a) 10 to 80% by weight, in particular 20 to 60% by weight, of a pigment,
b) 0.1 to 20% by weight, in particular 0.1 to 15% by weight, of an oxyalkylation product which is obtained by addition of optionally substituted styrenes onto optionally substituted phenols and reaction with ethylene oxide and/or propylene oxide,
c) 2 to 30% by weight of a polyether-polyol having a boiling point under normal pressure of greater than 150° C. and
d) if appropriate further additives, and water as the remainder, which are particularly suitable for pigmenting naturally occurring and synthetic materials, such as emulsion paints, emulsion coatings and emulsion printing inks, have been found.

12 Claims, No Drawings

AQUEOUS PIGMENT PREPARATIONS

The invention relates to aqueous pigment preparations, a process for their preparation and their use for pigmenting naturally occurring and synthetic materials.

Aqueous pigment preparations such as are described explicitly in DE-A-36 41 677 essentially comprise, in addition to water and pigment:

an oxyalkylation product which is obtained by addition of styrene onto phenol and reaction with ethylene oxide and volatile solvents, such as glycols, for example propane-1,2-diol, monoethylene glycol and/or diethylene glycol.

However, these pigment preparations still have certain disadvantages in their use. The present invention thus relates to aqueous pigment preparations comprising a) 10 to 80% by weight, in particular 20 to 60% by weight, of a pigment, b) 0.1 to 20% by weight, in particular 0.1 to 15% by weight, of an oxyalkylation product which is obtained by addition of optionally substituted styrenes onto optionally substituted phenols and reaction with ethylene oxide and/or propylene oxide, c) 2 to 30% by weight of a polyether-polyol having a boiling point under normal pressure of greater than 150° C. and d) if appropriate further additives, and water as the remainder.

The pigments which the formulations according to the invention comprise are not subject to any limitation. They can be organic or inorganic in nature. Suitable organic pigments are, for example, those of the azo, disazo, polyazo, anthraquinone or thioindigo series, and furthermore other polycyclic pigments, for example from the phthalocyanine, quinacridone, dioxazine, naphthalenetetracarboxylic acid, perylenetetracarboxylic acid or isoindoline series, as well as metal complex pigments or laked dyestuffs, such as Ca, Mg or Al lakes of dyestuffs containing sulphonic acid and/or carboxylic acid groups, and also carbon blacks, which are to be understood as pigments in the context of this Application, a large number of which are known, for example, from Colour Index, 2nd edition. Acid to alkaline carbon blacks from the group consisting of furnace blacks or gas blacks are to be mentioned in particular.

Suitable inorganic pigments are, for example, zinc sulphides, ultramarine, titanium dioxides, iron oxides, nickel- or chromium-antimony-titanium dioxides, cobalt blue and chromium oxides.

Metal-containing or metal-free phthalocyanine pigments, the metal-containing pigments having copper, cobalt or nickel in particular as the central atom, such as copper phthalocyanine pigments, for example Colour Index Pigment Blue 15 or Pigment Green 7, arylamide pigments of the disazo type, for example Pigment Yellow 83, Pigment Yellow 17, and Carbon Black 7, zinc sulphides and ultra-marine are particularly preferred.

Oxyalkylation products of component b) which are to be mentioned in particular are those of the formula (I)

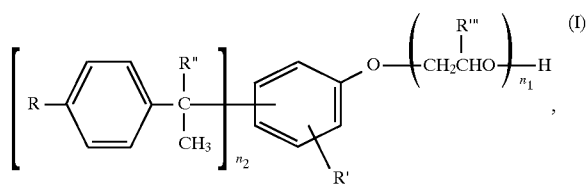

wherein

R represents hydrogen or $C_1$–$C_4$-alkyl, in particular methyl,

R' denotes hydrogen, $C_1$–$C_{12}$-alkyl, in particular methyl, or $C_1$–$C_4$-alkoxycarbonyl, in particular methoxycarbonyl, R" and R'" independently of one another represent hydrogen or methyl, $n_1$ denotes 6 to 40 and $n_2$ denotes 1 to 3, wherein R'" in each case independently denotes hydrogen or methyl for each of the $n_1$ units.

Particularly preferred oxyalkylation products of component b) can be represented by the following formula

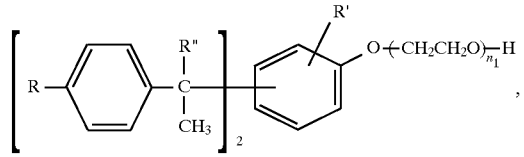

in particular

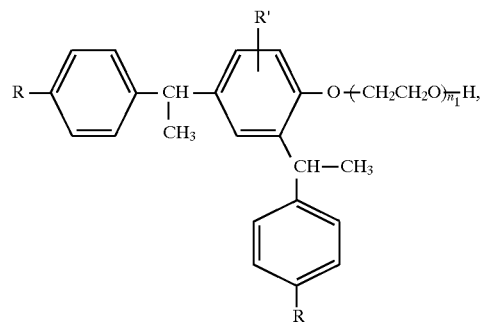

wherein

R, R' and R" have the above meaning, and preferably represent hydrogen or methyl, and $n_1$ preferably represents 6 to 30.

The addition products are prepared by reaction of optionally substituted styrenes with optionally substituted phenols and subsequent reaction with ethylene oxide and/or propylene oxide in a known manner (see, for example, GB 854,952, equivalent to DE-A-11 21 814).

Possible polyether-polyol components c) are preferably homo-, co- or block co-polyether-polyols which are preferably prepared by reaction of ethylene oxide and/or propylene oxide with water or with low molecular weight alcohols which have at least two hydroxyl groups, such as, for example, ethylene glycol, 1,2- or 1,3-propanediol, 1,2- or 1,4-butanediol, hexanediol, glycerol or pentaerythritol, or with low molecular weight amines which carry at least two amino groups with reactive hydrogen atoms, such as ethylenediamine or diethanolamine. Preferred polyether-polyols are polyalkylene glycols which have an average molecular weight, determined as the number-average, of 250 to 11 000, in particular 250 to 4 000, particularly preferably 250 to 1

000. Polyethylene glycols and/or polypropylene glycols are especially preferred.

The preparations according to the invention can furthermore comprise, as a further constituent, oxyalkylation products (component e) which are obtainable by condensation of aromatics containing phenolic OH groups with formaldehyde and amines which contain an NH group which is reactive towards formaldehyde, or derivatives of such oxyalkylation products. Preferred products here are those which are obtained by oxyalkylation of compounds of the formula (II)

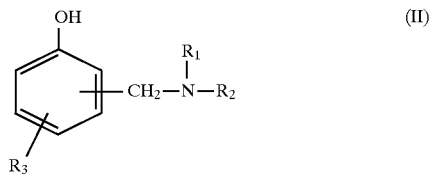

wherein
- $R_1$ denotes the monovalent radical of an optionally substituted aliphatic, cycloaliphatic or aromatic hydrocarbon,
- $R_2$ denotes hydrogen or the monovalent radical of an optionally substituted aliphatic, cycloaliphatic or aromatic hydrocarbon and
- $R_3$ denotes hydrogen, $C_1$–$C_{20}$-alkyl, $C_5$–$C_7$-cycloalkyl, phenyl, benzyl, halogen, hydroxy, $C_1$–$C_{18}$-alkoxy, carboxyl or $C_1$–$C_{18}$-alkoxycarbonyl, the oxyalkylation reagents used preferably being ethylene oxide, propylene oxide, butylene oxide, styrene oxide, glycidol or mixtures of these compounds, but in particular ethylene oxide, optionally together with propylene oxide. These oxyalkylation products (component e) are preferably added in amounts of 0 to 20, in particular 0 to 18% by weight. Oxyalkylation products of this type are described, for example, in U.S. Pat. No. 4,369,070, equivalent to DE 27 11 240.

Furthermore, for example, preservatives, such as isothiazolidones, for example 1,2-benzisothiazol-3-(2H)-one, chloro-2-methyl-4-isothiazolin-3-one or 2-methyl-4-isothiazolin-3-one, pentachlorophenol sodium, 1,3,5-triethylolhexahydro-s-triazine or mixtures thereof, are to be understood, these in general being employed in an amount of 0 to 1% by weight, preferably 0.05 to 0.5% by weight, in particular 0.0001 to 0.2% by weight.

The preparations according to the invention can furthermore comprise further additives customary for preparations of this type.

Preferred pigment preparations comprise volatile glycols, such as propane-1,2-diol, monoethylene glycol or diethylene glycol, in amounts of less than 4%, in particular less than 1%. Pigment preparations which are essentially free from these volatile glycols are particularly preferred.

Particularly preferred pigment preparations comprise at least 10% by weight of water.

The invention furthermore relates to a process for the preparation of the preparations according to the invention, which is characterized in that the individual constituents of the preparation are homogenized with water in conventional wet comminuting units, such as kneaders, kneading screws, bead mills, rotor-stator mills, dissolvers, corundum disc mills, vibratory mills and in particular in high-speed stirred bead mills with grinding bodies having a size of 0.1 to 2 mm diameter.

A particularly preferred process variant here is that in which all the components apart from the pigment are first introduced into water and are homogenized in a dissolver. The pigment is then introduced and the mixture is ground continuously or discontinuously in a stirred mill with suitable bead sizes until the desired fine division is reached. In the case of continuous grinding, the pigment preparation is circulated, for example, in a stirred mill, one circuit being called a passage, or is passed through a cascade of stirred mills. In the case of discontinuous grinding, the stirred mill is recharged for each grinding operation. It is also possible for all or some of the polyglycol ether component c) to be first introduced after the grinding. The preservative can also be added before or after the grinding. For example, readily water-soluble preservatives are preferably added after the grinding.

The invention furthermore relates to compounds of the formula (I)

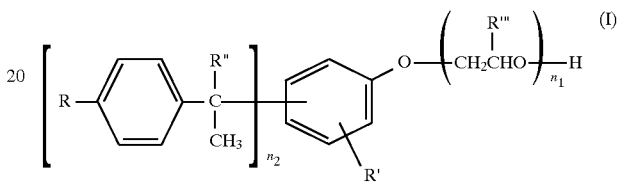

wherein
- R represents hydrogen or $C_1$–$C_4$-alkyl, in particular methyl,
- R' denotes hydrogen, $C_1$–$C_{12}$-alkyl in particular methyl, or $C_1$–$C_4$-alkoxycarbonyl, in particular methoxycarbonyl,
- R" and R'" independently of one another represent hydrogen or methyl,
- $n_1$ denotes 6 to 40 and
- $n_2$ denotes 1 to 3, wherein R'" in each case independently denotes hydrogen or methyl for each of the $n_1$ units, with the proviso that R' does not denote hydrogen if R" and the R'" of all the $n_1$ units represent hydrogen.

The invention furthermore relates to the use of the pigment preparations according to the invention for pigmenting naturally occurring or synthetic materials.

They are particularly suitable for the preparation of emulsion paints, emulsion coatings, water-dilutable coating systems, aqueous flexographic and gravure printing inks, wallpaper paints, aqueous wood preservative systems and wood stains and plasters, and for pigmenting coloured pencil leads, fibre-tip pens, inkjet inks, drawing inks, pastes for ball-point pens, chalks, detergents and cleaning compositions, shoe care compositions, nonwoven textile or paper pulp pigmentations, paper staining colours and cardboard printing inks, and for colouring latex products, abrasives, spin-dyeing preparations and films.

The preparations according to the invention have an outstanding ability to be dispersed or distributed in hydrophilic media as an advantage over the aqueous pigment preparations which are already known.

The compatibility in various binder systems, such as, for example, latex, polyvinyl acetate, acrylates, silicates, etc., is also significantly improved.

A feature which is to be emphasized in particular is the significantly improved redispersibility of preparation contents which have dried or partly dried.

They furthermore have a very low tendency to dry partly or dry out.

The pigment preparations according to the invention have an optimum fine division in the dispersion. The viscosity, flow properties and the preconditions thus necessary for excellent metering possibilities, such as, for example, by means of pumps, are significantly improved as a result.

The pigment preparations according to the invention have a very high tinctorial strength and brilliance, an excellent levelness and covering power in opaque applications, outstanding transparency when used in polymers, for example films, and good flow properties. High pigment concentrations can be achieved in the preparations. The preparations can be prepared with little expenditure on grinding. For example, with comparable grinding parameters, the desired pigment particle size distribution can be achieved in fewer passages or with relatively little introduction of energy by continuous bead grinding. They furthermore have a very good storage stability.

EXAMPLE 1

A homogeneous mixture comprising:

48 parts by weight of C.I. Pigment Red 112, 6 parts by weight of an oxyalkylation product of component b) which has been obtained by addition of 2 molar equivalents of styrene onto 1 molar equivalent of phenol and subsequent reaction with 14 molar equivalents of ethylene oxide, 10 parts by weight of polyethylene glycol having an average molecular weight of 400 (component c), 6 parts by weight of an oxyalkylation product of component e) which has been obtained by reaction of 1 molar equivalent of cyclohexylamine, 2 molar equivalents of formaldehyde and 1 molar equivalent of nonylphenol and subsequent ethoxylation with 28 molar equivalents of ethylene oxide in accordance with U.S. Pat. No. 4,369,070, DE-A-27 11 240 (Example 1) and 30 parts by weight of water was prepared in a dissolver.

Grinding was carried out in a stirred bead mill, with cooling, until a particle size of <0.5 μm was reached.

After the grinding, 0.1 part by weight of 1,2-benzisothiazol-3-(2H)-one were introduced homogeneously as a preservative.

An aqueous pigment preparation with outstanding flow properties coupled with a high tinctorial strength, a low tendency to partial drying and an outstanding compatibility with commercially available paints, coatings and textile printing inks was obtained.

Advantageous preparations were also found when the following preservatives or mixtures thereof were used: chloro-2-methyl-4-isothiazolin-3-one, 2-methyl-4-isothiazolin-3-one, pentachlorophenol sodium and 1,3,5-triethylolhexahydro-5-triazine.

EXAMPLE 2

The following aqueous pigment preparation, which likewise has the advantages mentioned, was also obtained in the manner described in Example 1.

Preparation comprising:

32 parts by weight of C.I. Pigment Yellow 83

3.6 parts by weight of component e) from Example 1

6.4 parts by weight of component b) from Example 1

6.5 parts by weight of component c) from Example 1

51.4 parts by weight of water 0.1 part by weight of preservative according to Example 1.

EXAMPLE 3

The following aqueous pigment preparation, which likewise has the advantages mentioned, was also obtained in the manner described in Example 1.

Preparation comprising:

43 parts by weight of C.I. Pigment Blue 15:3

4 parts by weight of component b) from Example 1

8 parts by weight of component e) from Example 1

7 parts by weight of component c) from Example 1

37.9 parts by weight of water 0.1 part by weight of preservative according to Example 1.

EXAMPLE 4

The following aqueous pigment preparation, which likewise has the advantages mentioned, was also obtained in the manner described in Example 1.

Preparation comprising:

38 parts by weight of carbon black 12 parts by weight of component e) from Example 1

2 parts by weight of component b) from Example 1

10 parts by weight of component c) from Example 1

37.9 parts by weight of water 0.1 part by weight of preservative according to Example 1.

EXAMPLE 5

The following aqueous pigment preparation, which likewise has the advantages mentioned, was also obtained in the manner described in Example 1.

32 parts by weight of C.I. Pigment Orange 34

12 parts by weight of component b) from Example 1

8 parts by weight of an oxyalkylation product (likewise of component b) which was obtained by addition of 2.7 molar equivalents of styrene onto 1 molar equivalent of phenol and subsequent reaction of 27 molar equivalents of ethylene oxide, 8 parts by weight of component c) from Example 1

45.9 parts by weight of water 0.1 part by weight of preservative according to Example 1.

EXAMPLES 6 TO 23

Further advantageous pigment preparations were prepared analogously to Example 1 using the following components.

| Example | C.I. Pigment | % by weight | Component* b) % by weight | Component* c) % by weight | Preservative* % by weight | Water % by weight |
|---|---|---|---|---|---|---|
| 6 | Red 95 | 40 | 12 | 8 | 0.2 | 39.8 |
| 7 | Yellow 3 | 45 | 15 | 10 | 0.2 | 28.8 |
| 8 | Yellow 74 | 35 | 10 | 7 | 0.2 | 47.8 |
| 9 | Yellow 1 | 50 | 12 | 15 | 0.1 | 22.9 |
| 10 | Orange 5 | 40 | 12 | 10 | 0.2 | 37.8 |
| 11 | Yellow | 40 | 15 | 5 | 0.2 | 39.8 |
| 12 | Yellow 83 | 30 | 9 | 11 | 0.15 | 49.85 |
| 13 | Green 7 | 45 | 15 | 15 | 0.1 | 24.9 |
| 14 | Orange 13 | 38 | 12 | 20 | 0.05 | 29.95 |
| 15 | Orange 34 | 40 | 12 | 10 | 0.2 | 37.8 |
| 16 | Violett 23 | 25 | 15 | 12 | 0.2 | 47.8 |

-continued

| Example | C.I. Pigment | % by weight | Component* b) % by weight | Component* c) % by weight | Preservative* % by weight | Water % by weight |
|---|---|---|---|---|---|---|
| 17 | Black 1 | 25 | 12 | 13 | 0.2 | 49.8 |
| 18 | Black 7 | 45 | 8 | 25 | 0.1 | 21.9 |
| 19 | Blue 29 | 60 | 5 | 15 | — | 20.0 |
| 20 | Green 17 | 70 | 8 | 12 | — | 10.0 |
| 21 | Yellow 42 | 55 | 5 | 25 | — | 15.0 |
| 22 | Vat Red 29 | 20 | 15 | 15 | 0.2 | 49.8 |
| 23 | Blue 15:1 | 40 | 14 | 10 | 0.2 | 35.8 |

*corresponds to the component from Example 1

We claim:

1. Aqueous pigment preparations comprising
   a) 10 to 80% by weight of a pigment,
   b) 0.1 to 20% by weight of an oxyalkylation product which is obtained by addition of unsubstituted or substituted styrenes onto unsubstituted or substituted phenols and reaction with ethylene oxide and/or propylene oxide,
   c) 2 to 30% by weight of a polyether-polyol having a boiling point under normal pressure of greater than 150° C. and homo-, co- or block co-polyether-polyol having an average molecular weight, determined as the number average, of 250 to 11000 which is prepared by reaction of ethylene oxide and/or propylene oxide with water or with low molecular weight alcohols selected from the group consisting of ethylene glycol, 1,2- or 1,3-propanediol, 1,2- or 1,4-butanediol, hexandiol, glycerol and pentaerythritol or with low molecular weight amines selected from the group consisting of ethylenediamine and diethanolamine and
   d) optionally further conventional additives, and water as the remainder.

2. Aqueous pigment preparations according to claim 1, wherein pigment a) is inorganic or is an organic pigment from the polyazo, anthraquinone, thioindigo or the polycyclic series or is a metal complex pigment or a laked dyestuff, optionally containing sulphonic acid and/or carboxylic acid groups, and wherein the oxyalkylation product of component b) corresponds to the formula (I)

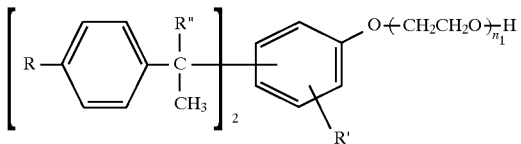

wherein

R represents hydrogen or $C_1$–$C_4$-alkyl,

R' denotes hydrogen, $C_1$–$C_{12}$-alkyl or $C_1$–$C_4$-alkoxycarbonyl,

R" and R'" independently of one another represent hydrogen or methyl, $n_1$ denotes 6 to 40 and $n_2$ denotes 1 to 3, wherein R'" in each case independently denotes hydrogen or methyl for each of the $n_1$ units.

3. Aqueous pigment preparations according to claim 1, wherein the oxyalkylation product of component b) corresponds to the formula

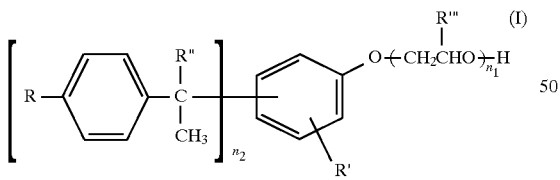

wherein

R, R' and R" in each case represent hydrogen or methyl and $n_1$ denotes 6 to 30.

4. Aqueous pigment preparations according to claim 1, wherein the polyetherpolyol of component c) is a polyethylene glycol and/or a polypropylene glycol.

5. Aqueous pigment preparation according to claim 1, wherein it comprises, as a further constituent, an oxyalkylation product (component e) which is obtainable by condensation of aromatics containing phenolic OH groups with formaldehyde and amines which contain an NH group which is reactive towards formaldehyde, or a derivative of such an oxyalkylation product.

6. Aqueous pigment preparation according to claim 2, wherein pigment a) is an organic pigment from the polycyclic series selected from the group consisting of phthalocyanine, quinacridone, dioxazine, naphthalenetetracarboxylic acid, perylenetetracarboxylic acid or isoindoline.

7. Aqueous pigment preparation according to claim 2, wherein

R represents methyl or hydrogen,

R' denotes hydrogen, methyl or methoxycarbonyl.

8. Aqueous pigment preparation according to claim 1, wherein the oxyalkylation product of component b) corresponds to the formula

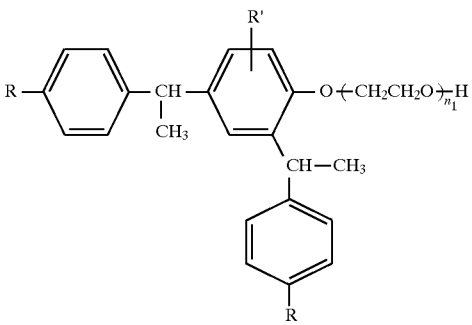

wherein

R and R' each represent hydrogen or methyl and $n_1$ denotes 6 to 30.

9. Aqueous pigment preparations according to claim 1, wherein the polyether-polyol of component c) has an average molecular weight, determined as the number-average, of 250 to 4000.

10. Process for the preparation of the aqueous pigment preparations according to claim 1, wherein the individual constituents of the preparation are homogenized with water in wet comminution units.

11. A naturally occurring or synthetic material pigmented with an aqueous pigment preparation according to claim 1.

12. Pigmented materials according to claim 11, wherein the materials are emulsion paints, emulsion coatings, water-dilutable coating systems, aqueous flexographic and gravure printing inks, wallpaper paints, aqueous wood preservative systems, wood stains, plasters, coloured pencil leads, fibre-tip pen inks, inkjet inks, drawing inks, pastes for ball-point pens, chalks, detergents and cleaning compositions, shoe care compositions, nonwoven textile or paper pulp pigmentations, paper staining colours, cardboard printing inks, latex products, abrasives, spin-dyeing preparations and films.

* * * * *